(12) United States Patent
Snyder

(10) Patent No.: US 10,405,533 B2
(45) Date of Patent: *Sep. 10, 2019

(54) ELECTROMAGNETIC BOOM CUSHIONING

(71) Applicant: AGCO Corporation, Duluth, GA (US)

(72) Inventor: Todd B. Snyder, Jackson, MN (US)

(73) Assignee: AGCO Corporation, Duluth, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/060,686

(22) PCT Filed: Apr. 20, 2017

(86) PCT No.: PCT/IB2017/000436
§ 371 (c)(1),
(2) Date: Jun. 8, 2018

(87) PCT Pub. No.: WO2017/195015
PCT Pub. Date: Nov. 16, 2017

(65) Prior Publication Data
US 2019/0069534 A1 Mar. 7, 2019

Related U.S. Application Data

(60) Provisional application No. 62/334,009, filed on May 10, 2016.

(51) Int. Cl.
*A01M 7/00* (2006.01)
(52) U.S. Cl.
CPC ........ *A01M 7/0078* (2013.01); *A01M 7/0053* (2013.01); *A01M 7/0075* (2013.01)
(58) Field of Classification Search
CPC . A01M 7/0078; A01M 7/0075; A01M 7/0053

USPC ................. 239/159, 163, 166, 168
See application file for complete search history.

(56) References Cited

U.S. PATENT DOCUMENTS

| | | | |
|---|---|---|---|
| 5,248,091 A * | 9/1993 | Thyberg | A01M 7/0075 239/166 |
| 5,427,542 A * | 6/1995 | Gerow | H01R 13/633 439/314 |
| 6,119,963 A | 9/2000 | Bastin et al. | |
| 7,823,803 B2 * | 11/2010 | Peterson | A01C 23/008 239/159 |

(Continued)

FOREIGN PATENT DOCUMENTS

GB 2038153 A 7/1980

OTHER PUBLICATIONS

European Patent Office, International Search Report for International Patent Application No. PCT/IB2017/000436, dated Oct. 9, 2017.

*Primary Examiner* — Steven J Ganey

(57) ABSTRACT

An electromagnetic breakaway system having a boom assembly, including a frame including a first portion and a second portion hingably coupled to the first portion; and a hinge assembly hingably coupling the first and second portions, the hinge assembly includes first and second electromagnets coupled respectively to the first and second portions, the first and second electromagnets comprising a same charge polarity when the first and second portions form an angle within a first pivot range, the first and second electromagnets comprising a different charge polarity when the first and second portions form an angle within a second pivot range.

20 Claims, 10 Drawing Sheets

(56) References Cited

U.S. PATENT DOCUMENTS 8,016,043 B2 * 9/2011 Naylor ................ A01B 69/024
　　　　　　　　　　　　　　　　　　　　　　172/126

* cited by examiner

ELECTROMAGNETIC BOOM CUSHIONING

CROSS REFERENCE TO RELATED APPLICATION

This application claims the benefit of U.S. Provisional Application No. 62/334,009 filed May 10, 2016, which is hereby incorporated by reference in its entirety.

BACKGROUND

Field of Invention

The present disclosure is generally related to boom assemblies, and more particularly, boom assemblies used on agricultural field dispensing equipment.

Discussion of Related Art

Agricultural field dispensing equipment, such as machines that are used to spray crops, generally use a spray boom. The spray boom hangs over crop in the field, and includes spray nozzles and product supply lines coupled thereto, among other supporting components. Due to the length of the spray boom, the ends of the spray boom have the ability to break away. In other words, the spray boom ends are generally hinged a predefined distance from the end of the spray boom (e.g., ten (10) feet) in case the operator of the machine to which the spray boom is coupled hits an obstacle (generally, object) while spraying. The hinge area is often referred to as a breakaway joint, and generally comprises a mechanical system that firmly holds together (in deployed alignment) an outer portion of the spray boom with an inner portion of the spray boom until the outer portion comes into contact with an object. If contact is made, the mechanical system reaches a stress point that eventually enables the release or breakaway of the spray boom outer portion (which includes the boom tip), enabling the boom tip to swing away from the object that it came in contact with. The mechanical system for the breakaway joint used today has several setup procedures, and also causes more stress on the outer portion when it hits an object to amply the needed pressure to make the mechanical breakaway process work. It would be desirable to improve upon the mechanical breakaway system.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

DESCRIPTION OF EXAMPLE EMBODIMENTS

Overview

Figure 1A:
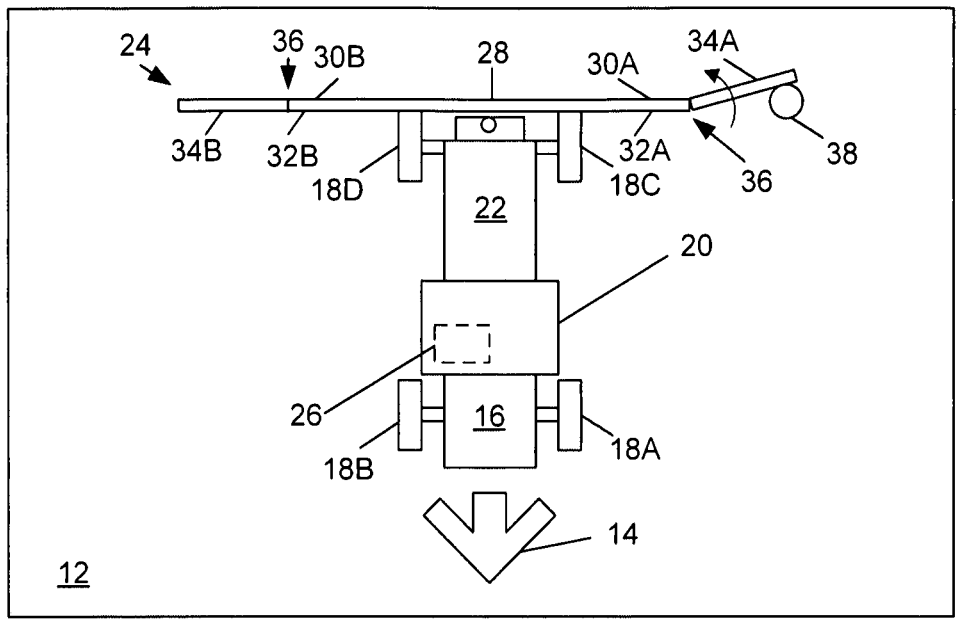
FIGS. 1A-1C are schematic diagrams that generally illustrate example breakaway scenarios in certain embodiments of an electromagnetic breakaway system.

In one embodiment, an electromagnetic breakaway system having a boom assembly, the system comprising: a frame comprising a first portion and a second portion hingably coupled to the first portion; and a hinge assembly hingably coupling the first and second portions, the hinge assembly comprising: first and second electromagnets coupled respectively to the first and second portions, the first and second electromagnets comprising a same charge polarity when the first and second portions form an angle within a first pivot range, the first and second electromagnets comprising a different charge polarity when the first and second portions form an angle within a second pivot range.

Detailed Description

Certain embodiments of an electromagnetic breakaway system, boom assembly, and associated methods (collectively, electromagnetic breakaway system or systems) are disclosed that use electromagnets to secure an outer portion of a boom assembly (boom assembly also referred to herein simply as a boom) in-place (e.g., in an aligned arrangement) relative to an inner portion of the boom while spraying instead of using mechanical means used in today's sprayer machines to perform a similar breakaway function. In one embodiment, at a joint where the outer portion of the boom is permitted to break away (or equivalently, pivot away) relative to the inner portion upon contact with an object (e.g., a pole, fence, etc.), plural electromagnets are energized to secure in-place the outer portion together with an inner portion of the boom. In the secured position, the outer and inner portions are collinearly aligned and extended out from a machine (e.g., sprayer machine) to which the boom is coupled to permit spraying along an extended area of a field. In a breakaway condition or scenario (hereinafter, also referred to as a breakaway), such as when during traversal in or around the field, the boom comes in contact with an obstacle (or generally, object), the electromagnets are switched off (de-energized), removing the electromagnetic force(s) between the electromagnets and allowing the outer portion to pivot freely to one side (or in some embodiments, both sides) of the boom, the pivoting relative to the inner portion. In one embodiment, a switch membrane is coupled to the length of the outer portion (on a front-facing portion of a frame of the boom, or in some embodiments, fore and aft sides of the boom frame). The switch membrane operates in one of at least two possible states at one time (e.g., open or closed, or equivalently, off or on, non-energized or energized, no (absence of) or low current flow or non-zero current (or threshold amount of current) flow, no or low voltage or non-zero voltage (or threshold amount of voltage), non-magnetized or magnetized, etc.), the operating state depending on whether there is contact or not between the object and the switch membrane.

In one embodiment, when the switch membrane comes in contact with the object, the switch membrane changes its state, which triggers via electrical/electronic circuitry a change to a zero or low energy state of the electromagnets. Upon the change in energy state of the electromagnets, the electromagnetic force holding the inner and outer portions in-place is removed (or significantly weakened in some embodiments), enabling the outer portion to pivot (e.g., upwards and rearward) on account of contact with the object until the object is no longer in contact with the boom. Once the object has been passed (e.g., no longer in contact), in one embodiment, the outer portion pivots back (e.g., via gravity, though in some embodiments, the pivot back influenced via a bias) and the electromagnets are again energized, returning to the energy state that enables the inner and outer portions to be secured in-place (e.g., in aligned arrangement). In some embodiments, the electromagnets may be energized immediately upon non-contact with the object (e.g., when the object is passed), where the electromagnets are provided a same charge polarity at angular values along an initial range of the return pivot to slow (via same-charge or repelling electromagnetic forces) the speed of the outer portion return to or near alignment with the inner portion, and then switched to opposing charge polarities along angular values along a subsequent, non-overlapping pivot range proximal to, or at, a position where the inner and outer portions are in an aligned arrangement, the opposing charges securing the inner and outer portions firmly in-place. In other words, the same charge polarity may be used to slow the pivoting movement to prevent slamming of the outer portion and hinge assembly upon return to the aligned arrangement, and the opposing charge polarity may be used to enable the alignment and hold together the inner and outer portions, even in the event of maximum acceleration forces (e.g., g-forces).

In contrast, conventional boom assemblies use mechanical means to perform the breakaway function, which requires several setup procedures and causes more stress on the outer portion when it hits an object to apply the needed pressure to make the mechanical breakaway process work. By using electromagnetic mechanisms to perform the breakaway function, certain mechanical parts of conventional boom assemblies may be omitted, providing improved reliability, longer life, and/or a variety of control (e.g., in embodiments where computerized control is used). Further, little to no setup is required, and the amount of stress on the outer portion is mitigated through the use of switch membrane(s) coupled to the electromagnets.

Having summarized certain features of electromagnetic breakaway systems of the present disclosure, reference will now be made in detail to the description of electromagnetic breakaway systems as illustrated in the drawings. While electromagnetic breakaway systems will be described in connection with these drawings, there is no intent to limit electromagnetic breakaway systems to the embodiment or embodiments disclosed herein. For instance, in the description that follows, the focus is on booms for self-propelled sprayer machines that apply product, such as pesticides, herbicides, fungicides, fertilizer, among others. However, in some embodiments, other agricultural machines or machines in other industries, whether self-propelled or towed, may be used where there is a need to have a breakaway function for the coupled boom, and hence are contemplated to be within the scope of the disclosure. Further, although the description identifies or describes specifics of one or more embodiments, such specifics are not necessarily part of every embodiment, nor are all various stated advantages necessarily associated with a single embodiment or all embodiments. On the contrary, the intent is to cover all alternatives, modifications and equivalents included within the spirit and scope of the disclosure as defined by the appended claims. Further, it should be appreciated in the context of the present disclosure that the claims are not necessarily limited to the particular embodiments set out in the description.

Figure 1B:
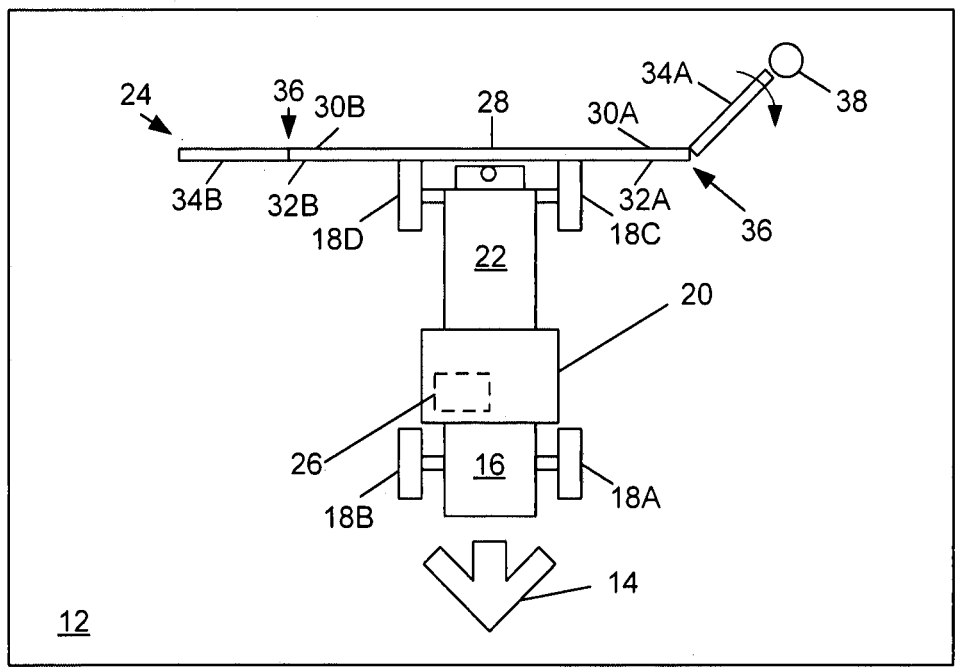
Figure 1C:
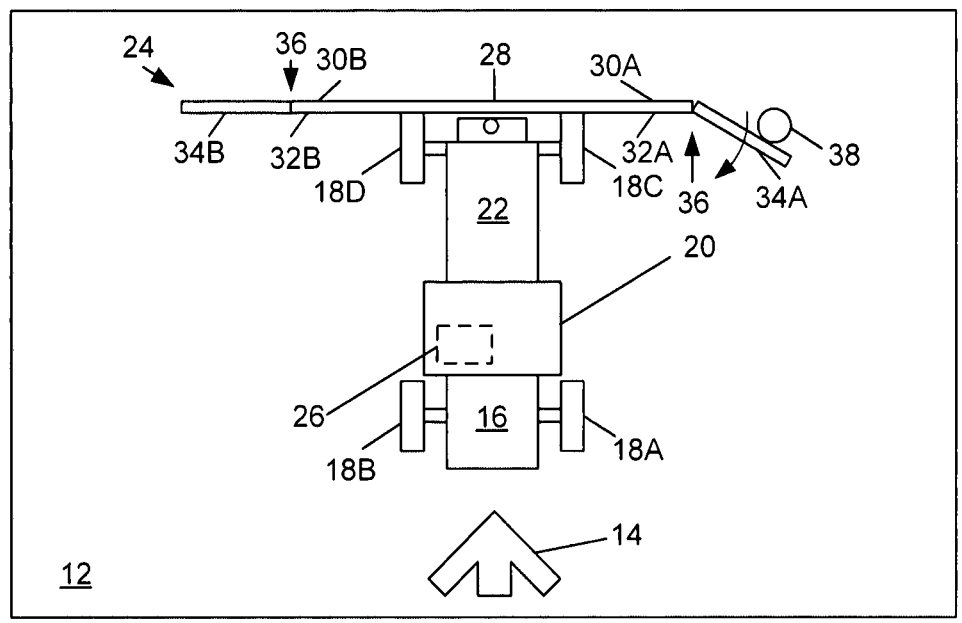

FIGS. 1A-1C are schematic diagrams that generally illustrate example breakaway scenarios in certain embodiments of an electromagnetic breakaway system. Referring to FIGS. 1A-1C, shown is a sprayer machine 10 traversing a field 12 in the direction indicated by an arrow 14. In FIGS. 1A-1B, the arrow is shown indicating traversal by the sprayer machine 10 across the field 12 in one direction (e.g., forward), and in FIG. 1C, in an opposing direction (e.g., reversed). In one embodiment, the sprayer machine 10 may be embodied as an AGCO Rogator, though sprayer machines of other designs may be used, including an AGCO Terragator, among other sprayer machines or machines of other functions and/or designs. That is, one having ordinary skill in the art should appreciate in the context of the present disclosure that the example sprayer machine 10 is merely illustrative, and that other machines (e.g., agricultural machines, or machines utilizing a boom in other industries) and/or components with like dispensing-type functionality (spraying pesticides, planting seeds, fertilizer, etc.) may be employed in some embodiments. For instance, though shown with a particular wheel and axle arrangement, the sprayer machine 10 may be comprised of independently controlled/driven wheels (e.g., via motor control, with or without an axle sharing the wheel pairs), different wheel or power arrangements, etc., as should be appreciated by one having ordinary skill in the art. Further, though shown as a self-propelled vehicle, in some embodiments, the sprayer machine 10 may be composed of a tractor-trailer arrangement where the boom assembly is towed behind the tractor.

In the depicted examples of FIGS. 1A-1C, the sprayer machine 10 comprises a front hood 16, wheels 18 (e.g., front wheels 18A, 18B, rear wheels 18C, 18D, though tracts may be used in some embodiments), a cab 20, a tank 22, which rests upon a chassis of the sprayer machine 10, and a boom assembly 24 coupled to the rear of the sprayer machine 10. Although shown coupled to the rear of the sprayer machine 10, in some embodiments, the boom assembly 24 may be coupled to the front and/or side of the sprayer machine 10 (and/or other types of machines that host a boom assembly 24), and hence are contemplated to be within the scope of the disclosure. Located underneath the front hood 16 is an engine, as is known. The cab 20 comprises an enclosure that protects the operator from environmental elements. The cab 20 further comprises a command and control console that enables the operator to control the navigation and sprayer functions, among other machine controls, of the sprayer machine 10. In one embodiment, the command and control console is part of a control system comprising a controller 26, which is used in some embodiments to control operations of an electromagnetic breakaway system. The tank 22 comprises a containment vessel for holding the product to be applied to the field. Though described as a tank 22, no particular geometric configuration is implied, and a variety of product-containing configurations are contemplated to be within the scope of the disclosure.

The boom assembly 24 comprises a frame 28 having respective left and right, foldable (relative to the sprayer machine 10) sections 30 (e.g., left section 30A, right section 30B). In some embodiments, the sections 30 may not be foldable. The frame 28 supports one or more conduits, such as hose(s) (hereinafter, referred to in the singular, with the understanding that additional hoses may be used to convey product or control fluid or gas as explained below), which conveys the product along the length of the boom assembly 24 for dispensing the product to the field 12. For instance, the boom assembly 24 may include one or more pumps coupled to the hose to influence the flow of product from the tank 22 to nozzles located along the boom. Some conduits may also be used for the conveyance of control fluids (e.g., hydraulic or pneumatic fluids) and/or electricity, including that used to actuate (e.g., actuate used herein to refer to the adjustment of settings, as well as activation of the controlled device) machine controls, and further or alternatively including actuators used to turn on and off boom sections and/or adjust boom height or actuate boom folding mechanisms, select nozzle types, adjust nozzle spray control (e.g., in electrostatic spraying implementations, such as selection of air-assist or pulsed control for an energized spray process (ESP)), control pump speeds, control spray pressure (e.g., via different nozzle, dual fluid, capstan, vari-target, etc.), and/or provide energy and/or control to the electromagnets and/or the switch membranes, among other functions.

Each section 30 comprises an inner portion 32 and an outer portion 34 (32A, 34A for the left section 30A, 32B, 34B for the right section 30B, respectively). The outer portion 34 is pivotal or hingeable relative to the inner portion 32 via a hinge assembly 36 (the hinge assembly 36 on the left side of the frame 28 described, with the same or similar description applicable to the hinge assembly 36 on the right hand side of the frame 28, the discussion of which is omitted here for brevity). The hinge assembly 36 may comprise a conventional ball and pin assembly or generally, a ball hinge joint, to mechanically couple the inner and outer portions 32, 34, though other hinge and/or pivoting mechanisms may be used as is conventionally known. The hinge assembly 36 further comprises electromagnets (shown in FIGS. 2A-3C) that are coupled respectively to the inner and outer portions 32, 34 and when in an energized state, hold together, via electromagnetic forces, the inner and outer portions 32, 34. In one embodiment, when held together, as in a deployed (extended and transverse to the sprayer machine 10) configuration, the inner and outer portions 32, 34 are collinearly aligned. In some embodiments, the electromagnets may hold together the inner and outer portions 32, 34 at an angular offset (versus collinear). In one embodiment, a strength and/or size of the electromagnets are sufficient to hold the inner and outer portions 32, 34 in transverse alignment when the outer portion 34 is subject to at least a maximum acceleration or g-force (e.g., when the sprayer machine 10 is turning while the sections 30 are deployed), while enabling a quick (e.g., immediate) breakaway upon contact with the outer portion 34 with an object in the field.

The outer portion 34 (e.g., 34A, 34B) comprises one or more switch membranes (shown in FIGS. 2A-3C). The switch membrane(s), described further below, perform a function of operating in one of at least two states (e.g., switching states) depending on whether the switch membrane is in contact with an obstacle or not. Through coupling (wired or wirelessly, directly or indirectly through intermediate circuitry) of the switch membrane with the electromagnets and an energy source, a change in state of the switch membrane causes a change in energy state of the electromagnets, which when energized enables the inner and outer portions 32, 34 to be held firmly together via electromagnetic forces and when de-energized, enables a breakaway upon contact of the switch membrane with the object. In one embodiment, the electromagnetic breakaway system comprises the boom assembly 24 and all or a portion of its component parts. In some embodiments, the electromagnetic breakaway system comprises the hinge assembly 36 or a subset of its component parts.

Referring to FIG. 1A, the sprayer machine 10 is shown traversing the field 12 in a forward direction, and the outer portion 34 is shown as pivoting rearward at the hinge assembly 36 responsive to the switch membrane coming in contact with an object 38 in the field 12. When the object 38 contacts the switch membrane coupled to, and running the length of, a front side of the outer portion 34, the switch membrane changes state (e.g., current flow is interrupted), resulting in a removal of energy from the electromagnets. For instance, the switch membrane may comprise a deformable housing with two wires coupled to a power source that, when deformed from contact with the object 38, causes an interruption in current flow. It should be appreciated by one having ordinary skill in the art that other switching configurations may be used. For instance, the switch membrane may be arranged in series with the electromagnets and an energy source (e.g., a current and/or voltage source), in parallel with the electromagnets and an energy source, or coupled to a coil or relay that functions to enable the flow (or interrupts the flow) of current to the electromagnets. Note that though current control is described primarily above as a mechanism to control the energy state of the electromagnets, changes in voltage and/or magnetic fields are also contemplated to be within the scope of the disclosure. In some embodiments, the change in state of the switch membrane may be communicated to the controller 26, which in turn causes the change in energy state (directly or indirectly via signaling to an intermediate switch) of the electromagnets. These and/or other mechanisms for a switching circuit to control the energy state of a device may be used according to known techniques in the art. When the electromagnets are de-energized, the electromagnetic forces holding the inner and outer portions 32, 34 are removed, enabling the outer portion 34 to pivot upon contact with the object 38 as the sprayer machine 10 (and boom assembly 24) advances forward against the object 38. Note that though a complete removal of energy to the electromagnets is emphasized, in some embodiments, the electromagnets may be configured to a low energy state. For instance, the low energy state may be an energy state suitable to enable a quick breakaway of the outer portion 34 relative to the inner portion 32, yet retaining a low energy to, for instance, reverse the current flow through the electromagnets to remove remanence effects, depending on the strength of the electromagnets, hysteresis, etc.

With reference to FIG. 1B, the outer portion 34, and in particular, the switch membrane, is no longer in contact with the object 38. Having just passed the object 38, the outer portion 34 pivots back to its pre-object-contact position. Digressing briefly, in one embodiment, the frame 28 comprises a triangular, truss-like tubular structure that results in a ball hinge joint that is angled relative to the vertical axis, which in turn results in a pivot movement during breakaway that is rearward and upward. When the object 38 is no longer in contact with the switch membrane, the pivot movement is substantially the reverse of the breakaway movement, that is, forward and downward. In other words, the return pivoting movement of the outer portion 34 to the aligned arrangement with the inner portion 32 is influenced by the force of gravity. One risk to the outer portion 34 and/or the hinge assembly 36 by the gravity-influenced, pivotal return to the aligned arrangement (where the outer portion 34 is aligned with the inner portion 32) is excessive shock at the hinge assembly 36 when the outer portion 34 reaches the aligned angular position. In one embodiment, a shock absorber may be arranged between the outer portion 34 and the hinge assembly 36 to reduce the speed and/or acceleration of the return pivot movement, hence cushioning the impact of the outer portion 34 swing on the hinge assembly 36. In some embodiments, the electromagnets may be energized and a polarity of each of the electromagnets controlled to cushion the impact, with or without the assistance of a shock absorber (e.g., the removal of the shock absorber reduces mechanical parts and may extend the life and/or improve serviceability). For instance, at a time corresponding to the removal of contact between the object 38 and the switch membrane, the return pivoting movement to the aligned arrangement by the outer portion 34 may be logically divided into a first pivot range and a second pivot range, the first pivot range including the start of the return pivoting movement by the outer portion 34 and the second pivot range including the aligned position. In one embodiment, the pivot ranges are non-overlapping. In one embodiment, at some predetermined time delay or angular value (e.g., as sensed by a sensor at or near the hinge assembly 36 or elsewhere) after the object 38 and the switch membrane are no longer in contact, and at the start of or during the first pivot range, the controller 26 causes energization of the electromagnets and causes the opposing electromagnets of the hinge assembly 36 to be of the same charge. In some embodiments, the sensor may be an accelerometer or velocity sensor that provides feedback to the controller 26 as to the speed of the return pivoting motion, and based on such signals, determines when to change the polarity. As the outer portion 34 returns to the aligned arrangement with the inner portion 32, the electromagnetic forces increase (due to the same charge on the electromagnets), which slows the speed (e.g., progressively, or in some embodiments, incrementally) of the swing or pivot movement to the aligned arrangement.

Note that in some implementations, the outer portion 34 may bounce off the object 38 and then re-contact the switch membrane until the object is passed. Thus in some embodiments, the energization of the electromagnets may be delayed when the contact is intermittent to ensure the object 38 has been passed. In some embodiments, the discernment between a bounce where the object will be expected to contact the switch membrane repeatedly and when non-contact between the object 38 and the switch membrane truly indicates that the object 38 has been passed may be facilitated with additional sensors, such as via camera sense, acoustic sense, radar sense, etc. In some embodiments, inertia based on commencement of pivoting movement from a static position and the weight of the outer portion 34 and/or hinge assembly 36 may mitigate a bouncing action, or in some embodiments, changing to a low energy state of the electromagnets upon contact of the object 38 with the switch membrane may reduce the risk of bouncing action by virtue of the electromagnetic forces in play to add an electromagnetic resistance.

Continuing, at some sensed (e.g., sensor at the hinge assembly 36 or elsewhere) predetermined angular value (or predetermined time lapse value, such as determined via clocking mechanisms in or connected to the controller 26), the second pivot range is entered, which triggers the controller 26 to cause the polarity of the charge on an electromagnet (or electromagnets) coupled to the inner portion 32 to be different than a polarity of the charge on an electromagnet (or electromagnets) coupled to the outer portion 34. In one embodiment, the second pivot range may be a value of zero, representing the aligned position, which in some embodiments may be determined based on a sensor or switch at the hinge assembly 36. In some embodiments, the second pivot range may correspond to an angular distance proximal (e.g., within a few degrees) to the aligned position, facilitating the alignment. By providing opposing polarity charges, the electromagnetic force holds the inner and outer portions 32, 34 together.

Referring now to FIG. 1C, shown is an embodiment where the sprayer machine 10 has backed-up and come in contact with the object 38, causing a breakaway to a side of the boom assembly 24 opposite that of the side the breakaway occurred in FIGS. 1A-1B. In this embodiment, a switch membrane is coupled along the length of the rear side of the outer portion 34 (in one embodiment, symmetrical or substantially symmetrical to the switch membrane coupled to the front side of the outer portion 34). In one embodiment, the switch membrane on the rear side of the outer portion 34 is coupled to its own respective set of electromagnets coupled to the inner and outer portions 32, 34, where the collective sets of electromagnets and respective switch membranes enables breakaway due to collision with objects in the field 12 on either side (e.g., whether traveling in a forward direction or in reverse). In contrast, conventional systems are concerned only with the front side collisions, wherein collisions when operating the sprayer machine 10 in reverse may cause significant damage to the boom. Operation of the rear-side switch membrane and associated electromagnets are the same as discussed above for the front-side switch membrane and electromagnets, and hence is omitted here for brevity.

Figure 2A:
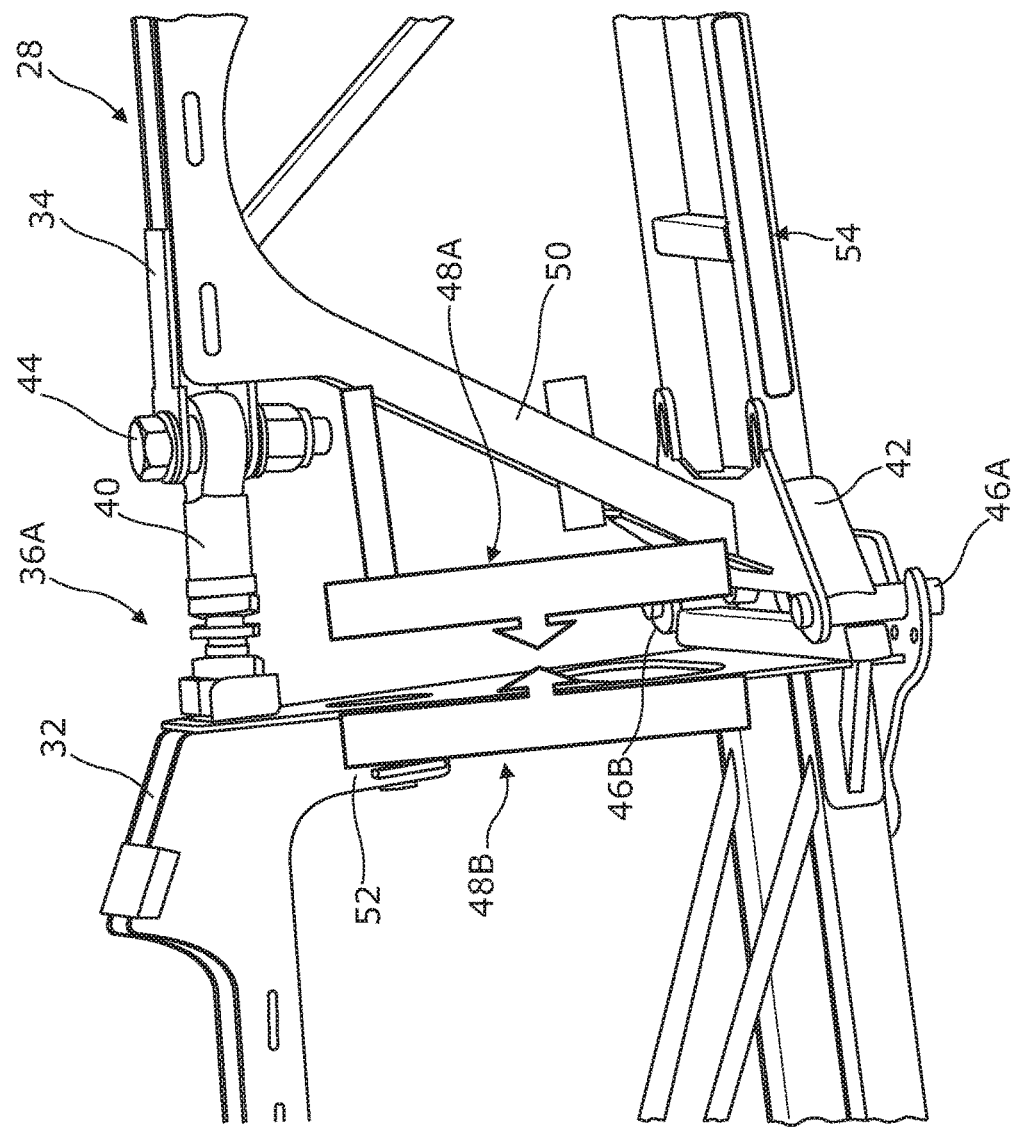
FIG. 2A is a schematic diagram that illustrates, in front isometric, fragmentary view, an example hinge assembly used for an embodiment of an electromagnetic breakaway system used for breakaway on a one side of a boom assembly.

Having described the general operation of certain embodiments of an electromagnetic breakaway system, attention is directed to FIG. 2A, which illustrates an example hinge assembly 36A used for an embodiment of an electromagnetic breakaway system and used for breakaway on one side of the boom assembly 24, such as depicted in FIGS. 1A-1B. It should be appreciated by one having ordinary skill in the art that the example hinge assembly 36A illustrated in FIG. 2A is one example design configuration, and that in some embodiments, other hinge designs may be used and hence are contemplated to be within the scope of the disclosure. The hinge assembly 36A comprises mechanical pivoting sections of the inner portion 32 and the outer portion 34 of the frame 28, including a top link 40 having a ball hinge joint and a lower link 42 having plural hinges 46 (e.g., 46A, 46B). Note that the hinge assembly 36A of FIG. 2A is for the left side (e.g., left of the sprayer machine 10 when sitting in the cab 20 facing forward) of the boom assembly 24. The top link 40 and lower link 42 enable a pivoting motion to both sides of the boom assembly 24, though in the depicted example, the pivoting movement is to one side (into the page in FIG. 2A). The hinge assembly 36A further comprises first and second electromagnets 48A, 48B, depicted schematically as coupled to end frames 50 and 52, respectively. The end frame 50 is part of the frame 28 terminating at the hinge assembly 36A and, in particular, part of the outer portion 34. The end frame 52 is part of the frame 28 terminating at the hinge assembly 36A and, in particular, part of the inner portion 32. The electromagnets 48A, 48B may be coupled to the end frames 50 and 52 according to any attachment mechanisms, such as via screw, bolt, weld, etc., or in some embodiments, integrated into the material of the frame 28. Note that the location of the coupling illustrated in FIG. 2A is one example, and that other locations may be used in some embodiments. Also, though described as single electromagnets 48A and 48B, respectively, each electromagnet 48 (e.g., 48A and/or 48B) may be comprised of plural electromagnets coupled together. In one embodiment, the electromagnets 48 each comprise windings with or without a solid core (e.g., the core comprising a ferromagnetic material). The windings carry current, with the flux density of the electromagnets 48 changing as a function of the magnitude of the current running through the windings, and the polarity of the electromagnets 48 controlled as a function of the direction of current through the windings, as is conventionally known. Although a focus is placed in the present disclosure on changing the current flowing through the windings, it should be appreciated that control of the electromagnets 48 may also be achieved based on changes in applied voltages or changes in the magnetic field. Also, though described using opposing electromagnets (e.g., coupled respectively to inner and outer portions 32, 34), in some embodiments, control may be achieved via a single electromagnet coupled to one of the inner or outer portions 32, 34, and the opposing portion 32 or 34 has coupled thereto a metal to which the electromagnet is attracted to or repelled from based on the energization or de-energization of the single electromagnet. Coupled to the front of the outer portion 34 is a switch membrane 54. The switch membrane 54 runs the length of the front of the outer portion 34, and in one embodiments, comprises a deformable (e.g., elastomeric, though not limited to such materials) housing that includes within the housing wiring (e.g., two wires, though not limited as such) that, when an object compresses (e.g., deforms) the switch membrane, interrupts the flow of current, hence changing a state of the switch membrane 54. In some embodiments, the switch membrane 54 may comprise an optical circuit that, when the switch membrane 54 is compressed, interrupts an optical signal and enables a change in state. These are just a few examples of switches, and it should be appreciated by one having ordinary skill in the art that any device that changes state (e.g., change in current flow, change in voltage, change in magnetization, change in structure, such as in a capacitor or piezo-based switch, etc.) may be used for the switch membrane 54, and hence is contemplated to be within the scope of the disclosure.

The switch membrane 54 is coupled to the electromagnets 48 and a power source (e.g., current source), the coupling achieved either directly (e.g., the electromagnets 48 arranged in series with the switch membrane 54 or in parallel with the switch membrane 54) or indirectly (e.g., through use of intermediate circuitry, such as a coil, relay, and/or controller, such as controller 26). Emphasis is placed on computerized control, with the understanding that a more rudimentary technology may be used for cooperation among the electromagnets 48 and the switch membrane 54, such as including only hardware components.

Figure 2B:
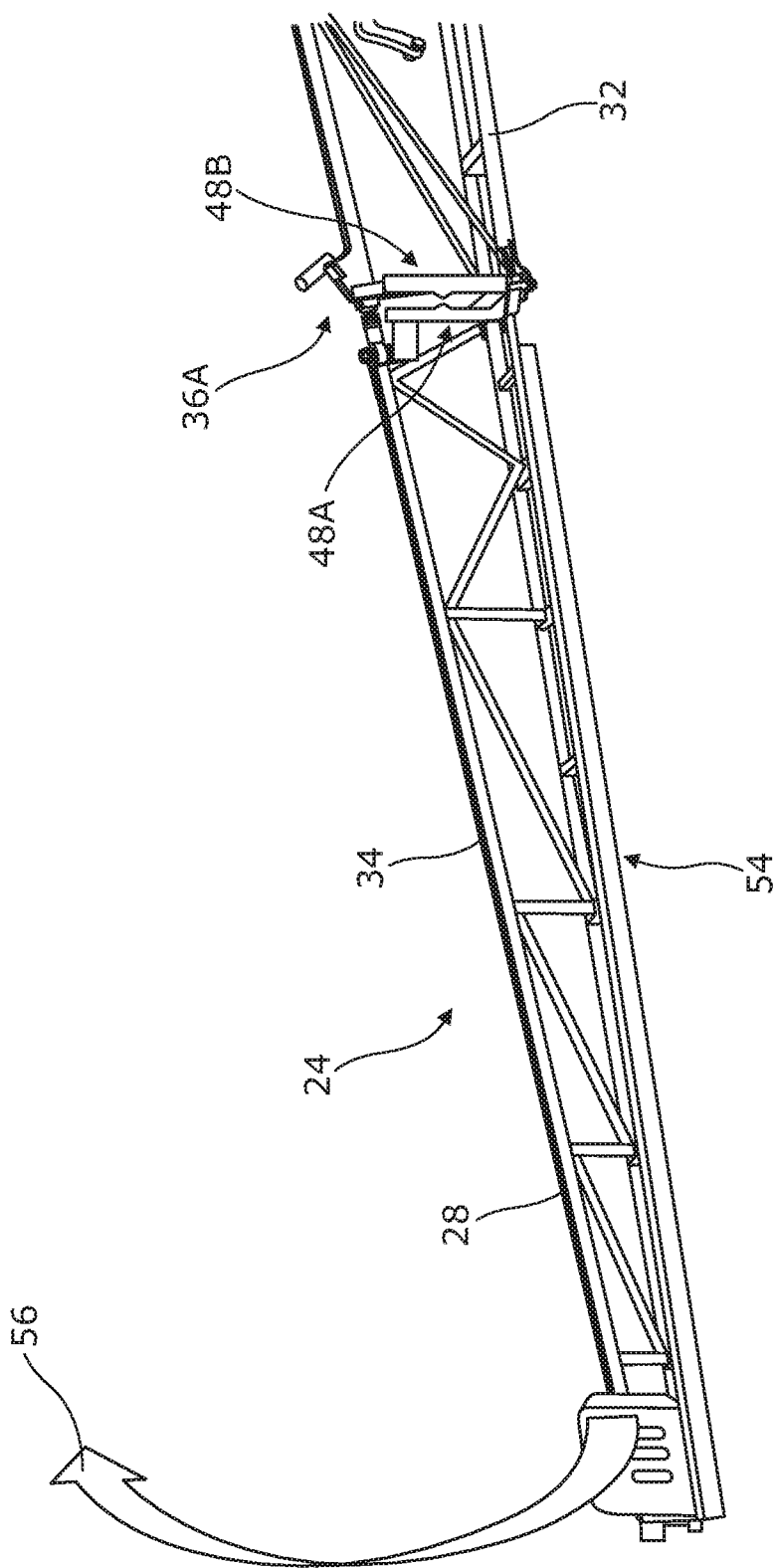
FIG. 2B is a schematic diagram that illustrates, in front isometric, fragmentary view, an example boom assembly comprising an example hinge assembly similar to that shown in FIG. 2A.

Referring now to FIG. 2B, the right side of the boom assembly 24 is shown with the hinge assembly 36A, with the sprayer machine 10 traveling in the forward direction (out of the page in FIG. 2B). The switch membrane 54 is shown running along the front of the outer portion 34 and the hinge assembly 36A hingeably couples the outer portion 34 to the inner portion 32. The electromagnet 48A is coupled to the outer portion 34, and the electromagnet 48B is coupled to the inner portion 32. Contact by an object (not shown) with the switch membrane 54 causes a change in state of the switch membrane 54. Based on the change in state of the switch membrane 54, the electromagnets 48 are de-energized according to any one of the circuit arrangements described above. Upon de-energization of the electromagnets 48, the electromagnetic forces that hold the inner and outer portions 32, 34 in alignment are removed (or significantly reduced), enabling the pivoting motion of the outer portion 34 relative to the inner portion 32 to one side of the boom assembly 24. The direction of the swing is rearward, as represented by arrow 56. When the object is no longer in contact with the switch membrane 54, the outer portion 34 swings back under the influence of gravity to the aligned arrangement relative to the inner portion 32. As indicated previously, the electromagnets 48 may be energized at a time corresponding to commencement of the return pivot to the aligned position to slow down the pivot movement to the aligned arrangement (e.g., by controlling polarity), or in some embodiments, allowed to freely swing back with a cushioning function, if needed, performed by a shock absorber.

Figure 3A:
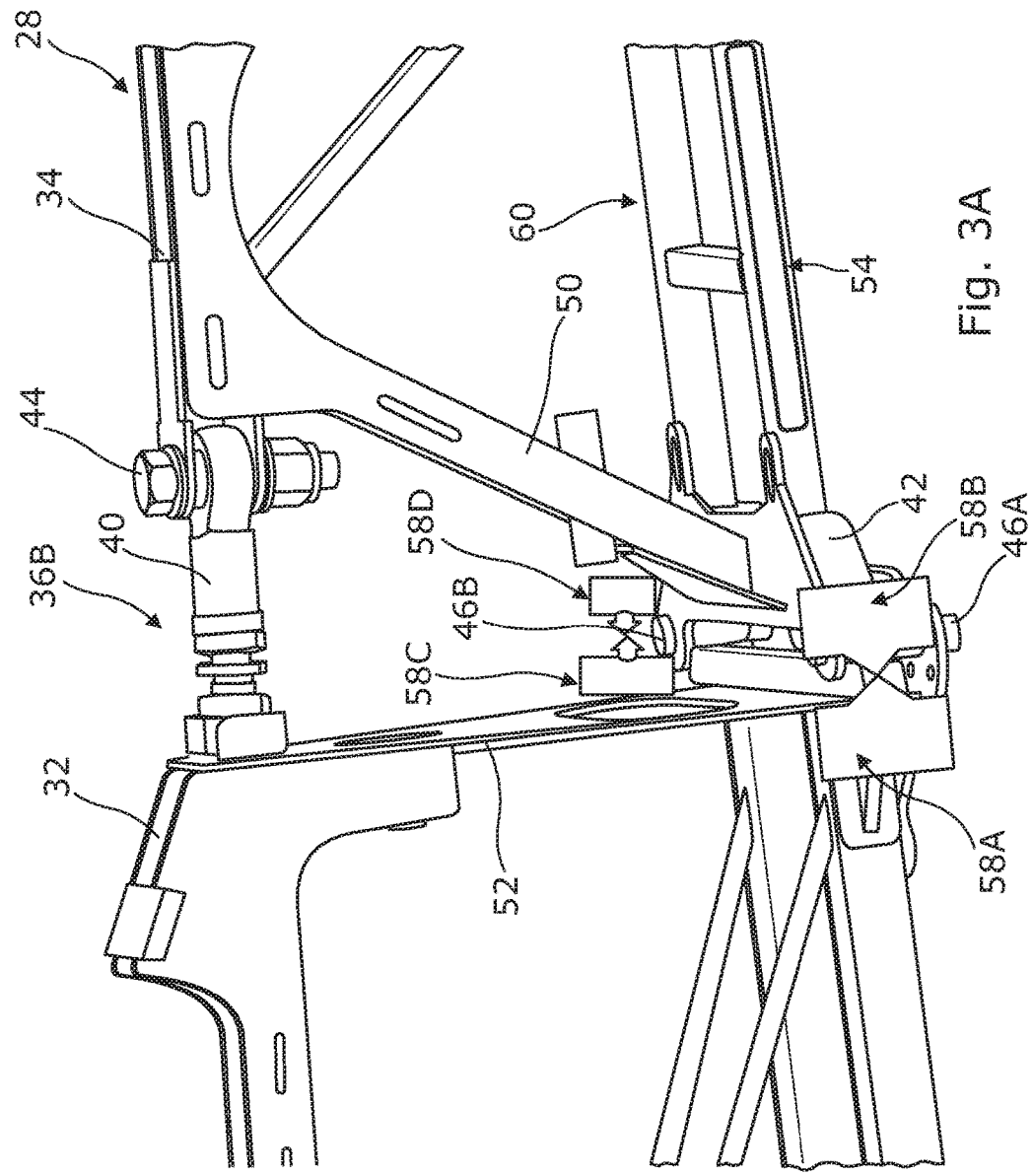
FIG. 3A is a schematic diagram that illustrates, in front isometric, fragmentary view, another example hinge assembly of an embodiment of an electromagnetic breakaway system used for breakaway on both sides of a boom assembly.

Attention is now directed to FIG. 3A, which illustrates an embodiment of a hinge assembly 36B that enables breakaway on both sides of a boom assembly 24 (the left side of the boom assembly 24). The hinge assembly 36B comprises the top link 40 and the lower link 42. The top link 40 comprises the ball hinge joint 44, the lower link 42 comprises hinges 46 (e.g., 46A, 46B). The hinge assembly 36B comprises two sets of spatially opposing electromagnets. On one side of the frame 28, the hinge assembly 36B comprises a first electromagnet 58A coupled to the inner portion 32 at the lower portion (e.g., lower link 42) of the end frame 52, and a second electromagnet 58B coupled to the outer portion 34 at the lower portion (e.g., lower link 42) of the end frame 50. In this embodiment, the electromagnets 58A, 58B, similar to the electromagnets 48 (FIG. 2A), are arranged symmetrically or substantially symmetrical across an upright or substantially upright plane (though in some embodiments, asymmetry configurations may be used). However, in some embodiments, such as depicted in FIG. 3C, the electromagnets 58A, 58B may be arranged spatially opposite each other across a substantially horizontal plane. Also on the same side as the electromagnets 58 is the switch membrane 54 running along the length of the outer portion 34 as described previously in association with FIGS. 2A-2B.

On the other side of the boom assembly 24 are a set of electromagnets 58C, 58D and another switch membrane 60 (obscured from view). The electromagnets 58C, 58D are coupled respectively to the lower end frames 50, 52 of the respective inner portion 32 and the outer portion 34. It should be appreciated by one having ordinary skill in the art in the context of the disclosure that, though illustrated with a given coupling placement, in some embodiments, the coupling of the electromagnets 58 (e.g., 58A-58D) may be elsewhere on the frame 28. The electromagnet 58C is symmetrically or substantially symmetrically positioned in spatial opposition to the electromagnet 58D across an upright or substantially upright plane. Similar to the description above for the electromagnets 58A, 58B, in some embodiments, the electromagnets 58C, 58D may be positioned spatially opposite a substantially horizontal plane, as depicted in FIG. 3C. The switch membrane 60 runs along the length of the outer portion 34, similar to the switch membrane 54 located on the other side. Operations of the electromagnets 58C, 58D and the switch membrane 60 are the same as the electromagnets 58A, 58B and the switch membrane 54, respectively, and hence discussion of the same is omitted here for brevity.

Figure 3B:
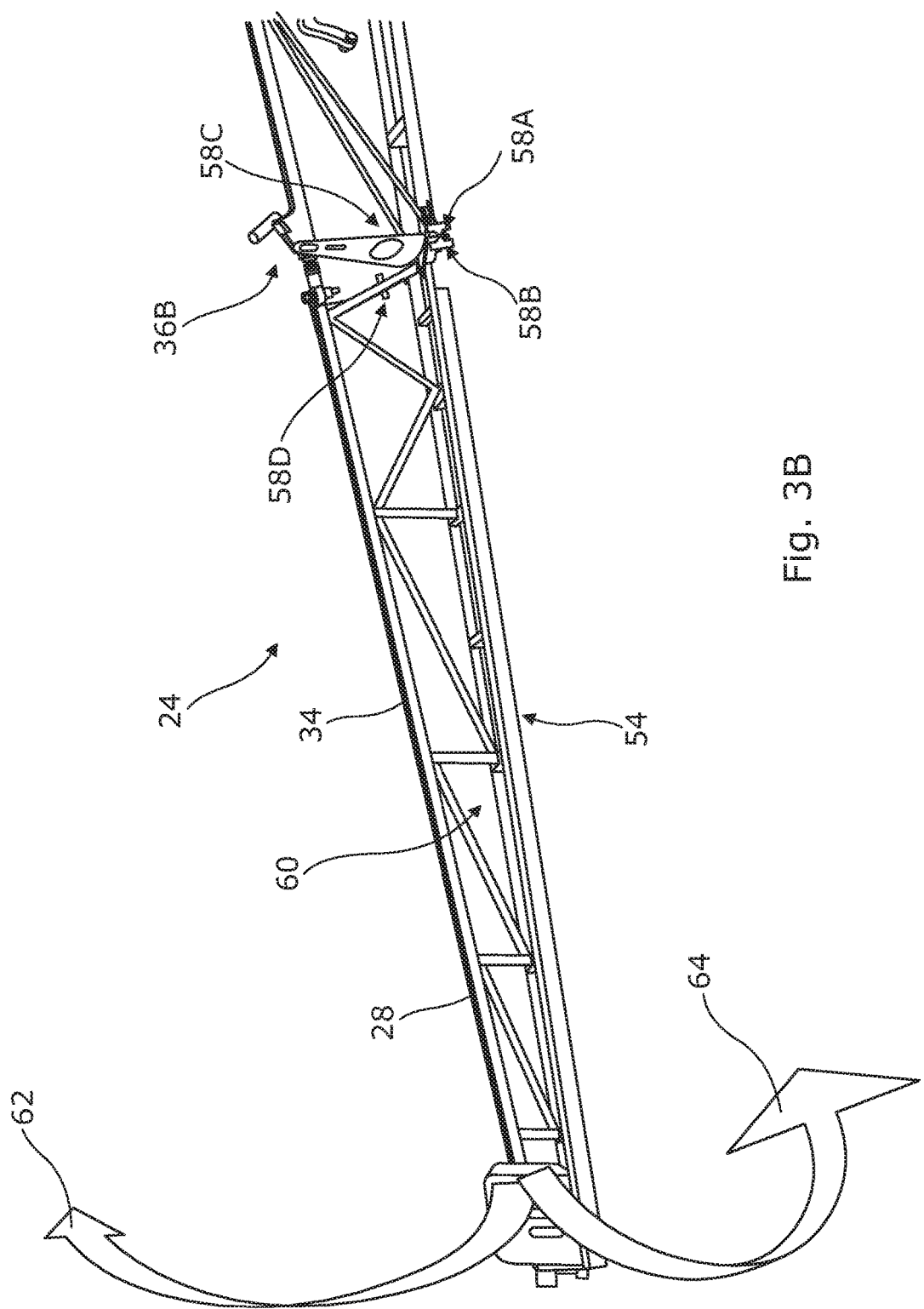
FIG. 3B is a schematic diagram that illustrates, in front isometric, fragmentary view, an example boom assembly comprising an example hinge assembly similar to that shown in FIG. 3A.
Figure 3C:
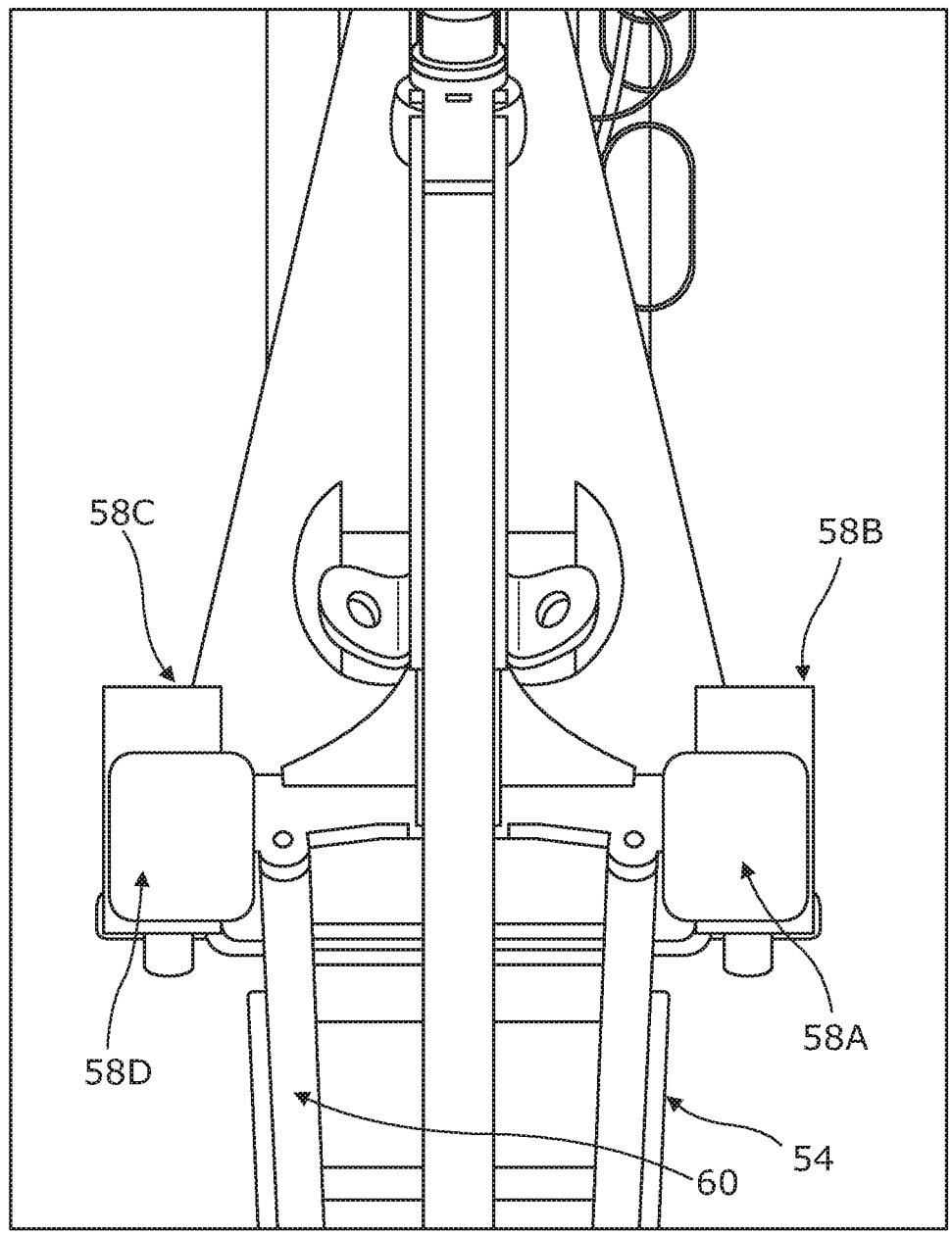
FIG. 3C is a schematic diagram that illustrates, in overhead plan, fragmentary view, another example hinge assembly of an embodiment of an electromagnetic breakaway system used for breakaway on both sides of a boom assembly.

Referring to FIG. 3B, the right side of the boom assembly 24 is shown using the hinge assembly 36B. The sprayer machine 10 is moving out of the page in FIG. 3B, and thus the switch membrane 54 is front-facing, and the switch membrane 60 (best shown in FIG. 3C) is rear-facing. In operation, when the switch membrane 54 comes in contact with an object in the field, the switch membrane 54 changes state, which causes the electromagnets 58A, 58B to change energy state (e.g., to be de-energized). Upon de-energization, the electromagnetic forces preventing pivoting of the outer portion 34 relative to the inner portion 32 (e.g., with a strength sufficient to prevent the release in the presence of a maximum acceleration or g-force) in the swing direction 62 (rearward, as represented by the arrow) are removed (or reduced), and the breakaway is enabled of the outer portion 34 in the swing direction 62 (e.g., upper and rearward). During the breakaway, the electromagnets 58C, 58D are still energized, though in some embodiments, energy is removed from them as well. Upon removal of the compression or contact of the object against the switch membrane 54, gravity influences the return of the outer portion 34 to the aligned arrangement with the inner portion 32. In some embodiments, the electromagnets may be energized with polarity controlled (electromagnets 58A, 58B of the same polarity charge) to slow down the return pivot and polarity further controlled (polarity of the electromagnets 58A, 58B of a different, attractive charge) to enable a secure and aligned arrangement between the inner and outer portions 32, 34. If the object comes in contact with the switch membrane 60 (such as if the sprayer machine 10 reverses and collides with the object), the switch membrane 60 changes state, which causes a change in energy state (de-energization) of the electromagnets 58C, 58D. Similar to the description above for electromagnets 58A, 58B, when the electromagnets 58C, 58D are de-energized, the electromagnets 58A, 58B remain energized, though in some embodiments, energy may be removed from them as well. By removing the electromagnetic force between the electromagnets 58C, 58D (through de-energization), the outer portion 34 pivots upward and forward as indicated by the arrow 64. When the object is no longer in contact with the switch membrane 60, the outer portion 34 pivots back under the influence of gravity. Similar to the operation on the other side of the frame 28, the return pivot to an aligned position may be achieved with energization of the electromagnets 58C, 58D along with a same polarity charge of the electromagnets 58C, 58D during a first pivot range and an opposite polarity charge during a second pivot range (e.g., at or near alignment) to hold the inner and outer portion 32, 34 together. Note that in some embodiments, the set of electromagnets 58A, 58B may be of greater electromagnetic strength than the set of electromagnets 58C, 58D, since the acceleration forces in the forward direction require a greater electromagnetic force to keep the inner and outer portions 32, 34 in an aligned position or arrangement than the forces expected in the reverse direction Though the embodiment described in FIGS. 3A-3C use two sets of electromagnets (e.g., 58A, 58B and 58C, 58D) along with respective switch membranes 54 and 60, in some embodiments, a single set of electromagnets (e.g., either 58A, 58B or 58C, 58D) may be used with both switch membranes 54 and 60. In other words, the electromagnets 58 may be of suitable strength and suitably positioned at the end frames 50, 52 to change the energy state of the electromagnets 58 in response to the change in state of the switch membranes 54 and 60.

Figure 4A:
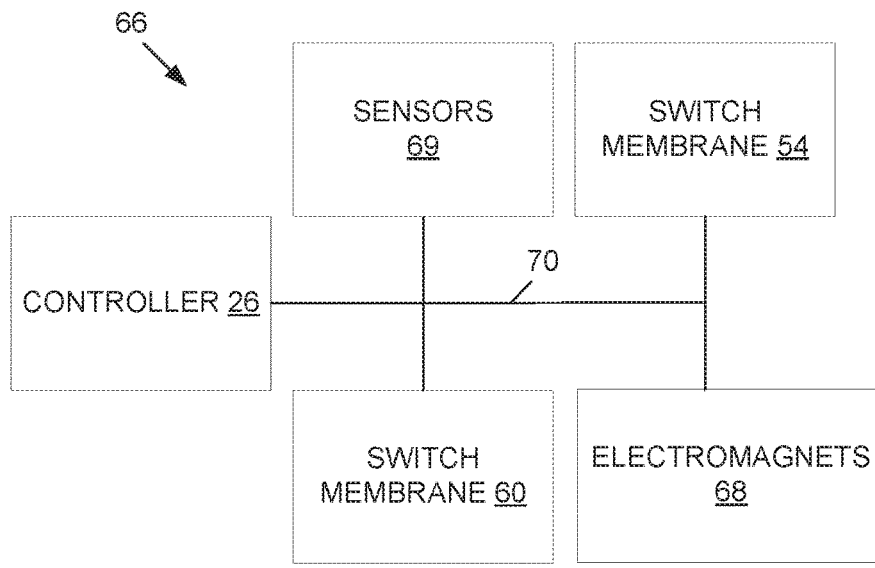
FIG. 4A is a block diagram of an embodiment of an example control system of an electromagnetic breakaway system.

Attention is now directed to FIG. 4A, which illustrates an example embodiment of a control system 66 used in an embodiment of an electromagnetic breakaway system. One having ordinary skill in the art should appreciate in the context of the present disclosure that the example control system 66 is merely illustrative, and that some embodiments of control systems may comprise fewer or additional components, and/or some of the functionality associated with the various components depicted in FIG. 4A may be combined, or further distributed among additional components, in some embodiments. In one embodiment, the control system 66 comprises control circuitry, and in the depicted embodiment, the controller 26. The control system 66 further comprises electromagnets 68, the switch membranes 54 and 60, and sensors 69, all coupled over a network 70, such as a controller area network (CAN), though not limited to a CAN network or a single network. In one embodiment, the network 70 may comprise a wired network (e.g., twisted pair, copper, etc.), a wireless network (e.g., based on IEEE 802.11, Bluetooth, Near Field Communications (NFC), etc.), or a combination of a wired and wireless network. The electromagnets 68 comprise the electromagnets 48 and 58, as described previously. The sensors 69 may include position sensors that sense the angular position of the outer portion 34 relative to the inner portion 32, which assists the controller 26 in determining what pivot range the outer portion 34 lies within and facilitates the actuation of the energization and/or polarity controls.

In one example operation, the change in state of the switch membranes 54 or 60 is communicated over the network 70 to the controller 26. The controller 26, responsive to the change in state, provides signals to the electromagnets 68 (or devices coupled between the controller 26 and the electromagnets 68, including relays, contactors, transistors, or other switches or devices controlling the electromagnets and/or controlling and/or enabling an energy source to the electromagnets). Based on the signals from the controller 26, the electromagnets 68 undergo a change in energy state. Signals provided by the controller 26 further comprise, in one embodiment, signaling to change the polarity to the electromagnets 68, such as providing a same polarity to a set of electromagnets 68 during a first pivot range of the outer portion 34 (FIG. 2B) and an opposing polarity to the set of electromagnets 68 during a second pivot range (e.g., at or near an aligned position between the inner and outer portions 32, 34). The change in polarity may be implemented by the controller 26 switching (or instructing a device to switch) the current direction through the electromagnets 68. As indicated above, the commencement of the energization and/or polarity control may be based on angular positioning feedback from the sensors 69 and/or based on clocking devices coupled to the network 70 or part of the controller 26 (e.g., in hardware, software, or a combination of hardware and software). Note that in some embodiments, the control system 66 may omit computerized control, as described previously.

Figure 4B:
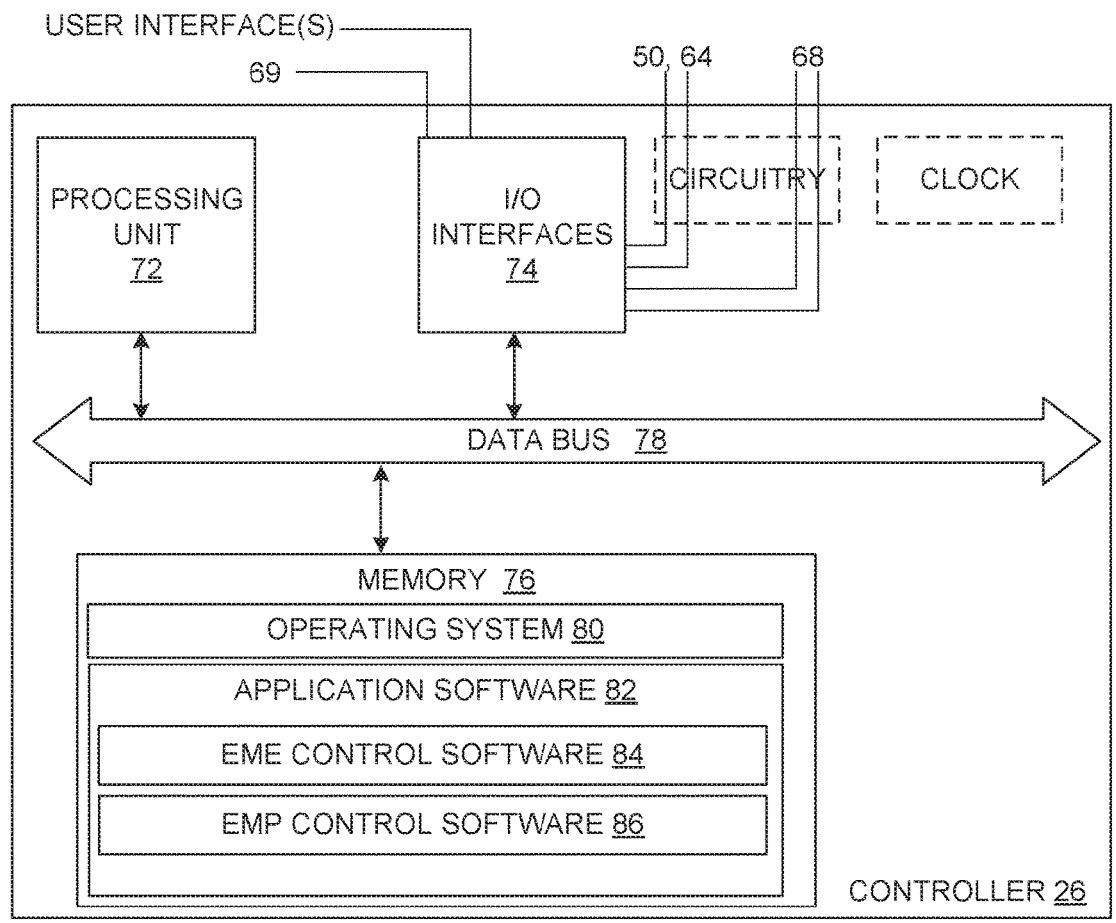
FIG. 4B is a block diagram of an embodiment of an example controller for the control system of FIG. 4A.

Referring to FIG. 4B, shown is an embodiment of an example controller 26, which comprises a computer architecture. It should be appreciated by one having ordinary skill in the art that the controller 26 depicted in FIG. 4B is one example illustration, and that in some embodiments, fewer, greater, and/or different components may be used. Also, it should be appreciated by one having ordinary skill in the art that certain well-known components of computer systems are omitted here to avoid obfuscating relevant features of the controller 26. In one embodiment, the controller 26 comprises one or more processing units 72, input/output (I/O) interface(s) 74, and memory 76, all coupled to one or more data busses, such as data bus 78. The memory 76 may include any one or a combination of volatile memory elements (e.g., random-access memory RAM, such as DRAM, SRAM, and SDRAM, etc.) and nonvolatile memory elements (e.g., ROM, Flash, solid state, EPROM, EEPROM, hard drive, CDROM, etc.). The memory 76 may store a native operating system, one or more native applications, emulation systems, or emulated applications for any of a variety of operating systems and/or emulated hardware platforms, emulated operating systems, etc. In the embodiment depicted in FIG. 4B, the memory 76 comprises an operating system 80 and application software 82. The application software 82 comprises electromagnet energization (EME) control software 84 and electromagnet polarity (EMP) control software 86. In some embodiments, the application software may comprise clocking software. It should be appreciated that in some embodiments, additional or fewer software modules (e.g., combined functionality) may be employed in the memory 76 or additional memory. In some embodiments, a separate storage device may be coupled to the data bus 78, such as a persistent memory (e.g., optical, magnetic, and/or semiconductor memory and associated drives). In some embodiments, a hardware clock may be coupled to the data bus 78. As described previously, circuitry may be used in cooperation with the switch membranes 54, 60 and/or the electromagnets 68, including relays, contactors, transistors, and/or one or more power sources (e.g., current sources, etc.) to facilitate signaling and/or operations among the controller 26, the switch membranes 54, 60, and the electromagnets 68 in some embodiments.

The electromagnet energization control software 84 controls the energy state of the electromagnets 68. The electromagnet energization control software 84 receives via the I/O interfaces 74 signals from the switch membranes 54 or 60 and the sensor(s) 69, and responsive to the signals, sends signals to the electromagnets 68 that change the energy state of the electromagnets 68 (e.g., energize the electromagnets 68, de-energize the electromagnets 68), enabling the break-away function and/or a basis for the polarity switching or control function of the electromagnetic breakaway system. For instance, the electromagnet energization control software 84 de-energizes one set of electromagnets 68 based on signals received from the switch membrane 54 disposed on one side of the boom assembly 24, and de-energizes another set of electromagnets 68 based on signals received from the switch membrane 60 disposed on the opposing side of the boom assembly 24, enabling a breakaway function on both sides of the boom assembly 24. In some embodiments, a single set of electromagnets 68 may be used to energize or de-energize the electromagnets 68 based on signals from the switch membranes 54 and 60. The electromagnet polarity control software 86 causes the application of a same charge polarity for a set of electromagnets 68 (e.g., during a sensed or time-determined first pivot range during return of the outer portion 34 after the object is no longer in contact with the switch membrane 54 or 60) and signaling of an opposing polarity among a set of electromagnets 68 (e.g., during a sensed or timed second pivot during return of the outer portion 34 to the aligned position). In one embodiment, the change in polarity is achieved via the controller 26 controlling the current direction through the electromagnets 68. The same charge polarity causes a slowing down of the pivot swing of the outer portion 34 (e.g., to counter the effects of gravity) and the opposing charge polarity enables holding the inner and outer portions 32, 34 together in the aligned position. In some embodiments, the functionality of the electromagnet energization control software 84 and the electromagnet polarity control software 86 may be combined, and in some embodiments, the functionality of the electromagnet polarity control software 86 may be omitted. In some embodiments, the functionality of the application software 82 may including causing the deployment (e.g., through controls of various actuators, as is known) of the boom assembly 24. Also, the application software 82 may also be used to de-energize the electromagnets 68 based on operator input. For instance, should the operator desire to fold the boom assembly 24, such as to enable navigation on roadways or paths by the sprayer machine 10 between fields, the operator may select a button or other user interface to instruct the controller 26 to cause the boom assembly 24 to fold, which in turn uses the application software 82 to perform this function, including de-energizing the electromagnets 68 to enable the folding of the boom assembly 24 to take place.

Execution of the application software 82, including the electromagnet energization control software 84 and the electromagnet polarity control software 86, are implemented by the processing unit 72 under the auspices of the operating system 80. In some embodiments, the operating system 80 may be omitted and a more rudimentary manner of control implemented. The processing unit 72 may be embodied as a custom-made or commercially available processor, a central processing unit (CPU) or an auxiliary processor among several processors, a semiconductor based microprocessor (in the form of a microchip), a macroprocessor, one or more application specific integrated circuits (ASICs), a plurality of suitably configured digital logic gates, and/or other well-known electrical configurations comprising discrete elements both individually and in various combinations to coordinate the overall operation of the controller 26.

The I/O interfaces 74 provide one or more interfaces to the network 70, as well as interfaces to one or more user interfaces. For instance, the I/O interfaces 74 receive wired or wireless signals from the switch membranes 54, 60 and sensors 69 and provides control signals to the electromagnets 68 (or intermediary devices disposed between the controller 26 and the electromagnets 68) to cause a change in state of the electromagnets and/or change in polarity. The I/O interfaces 74 may also be coupled to one or more user interfaces to enable control of navigation and/or other machine functions. For instance, the user interfaces may include an FNR handle, a keyboard/pad and/or mouse, a display device (e.g., tough-type display, liquid crystal diode (LCD), plasma-based, etc.), and/or other input devices (e.g., a microphone for audible input in some embodiments. In some embodiments, the user interfaces may comprise visual, audible, and/or tactile alarms, such as those that indicate that the switch membranes 54, 60 have come in contact with an object in the field. Note that in some embodiments, the display device may be a headset-type display that is coupled to the I/O interfaces 74. Note that the controller 26 and/or the control system 66 may comprise additional functionality, such as a cellular and/or radio frequency modem for communications with devices located external to the sprayer machine 10, machine control software for enabling sprayer boom logical partitioning and/or sprayer selection, global navigation satellite systems (GNSS) hardware and/or software, among other components as should be appreciated by one having ordinary skill in the art.

When certain embodiments of the controller 26 are implemented at least in part in logic configured as software/firmware, as depicted in FIG. 4B, it should be noted that the logic can be stored on a variety of non-transitory computer-readable medium for use by, or in connection with, a variety of computer-related systems or methods. In the context of this document, a computer-readable medium may comprise an electronic, magnetic, optical, or other physical device or apparatus that may contain or store a computer program for use by or in connection with a computer-related system or method. The logic may be embedded in a variety of computer-readable mediums for use by, or in connection with, an instruction execution system, apparatus, or device, such as a computer-based system, processor-containing system, or other system that can fetch the instructions from the instruction execution system, apparatus, or device and execute the instructions.

When certain embodiment of the controller 26 are implemented at least in part in logic configured as hardware, such functionality may be implemented with any or a combination of the following technologies, which are all well-known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

Figure 5:
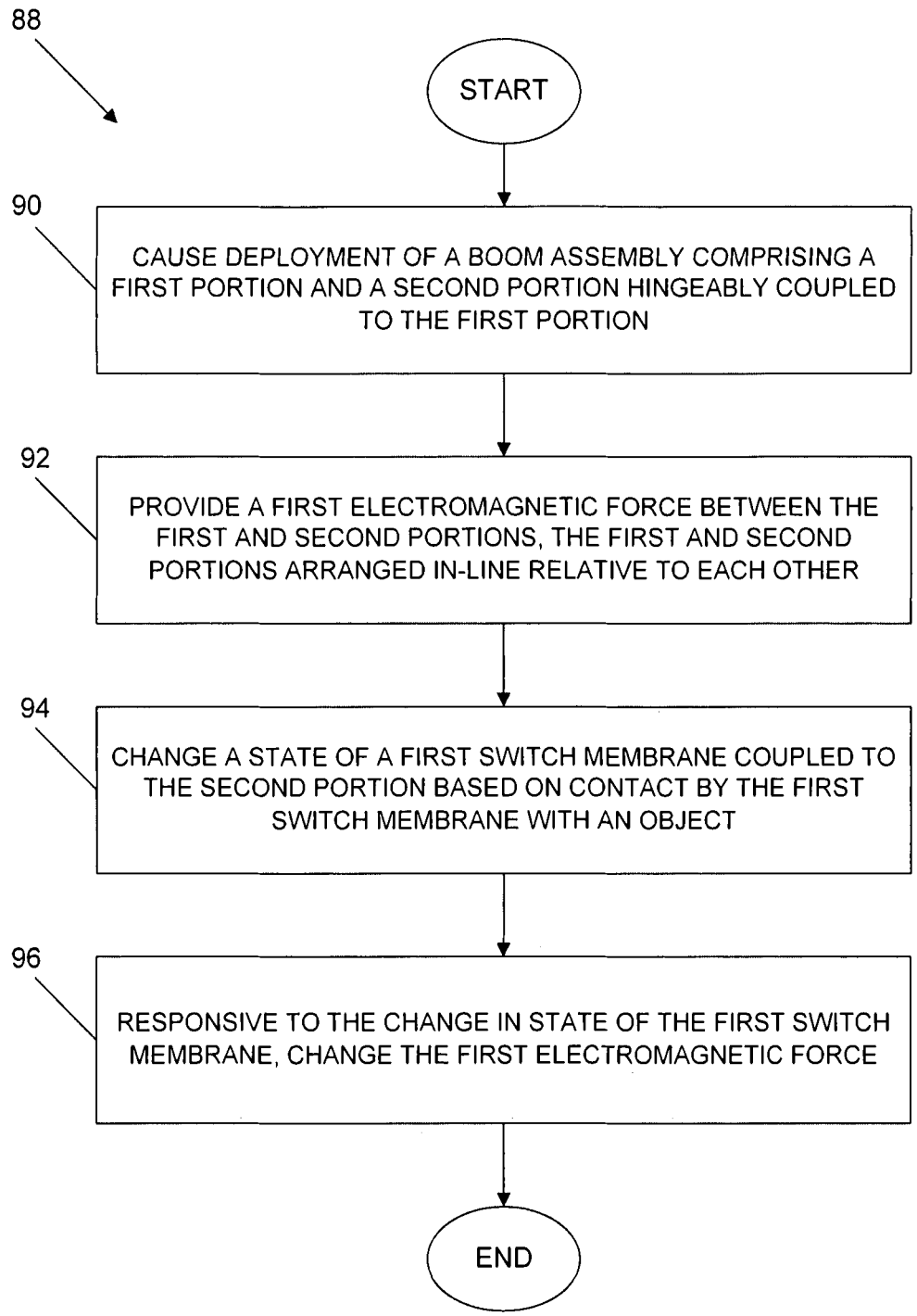
FIG. 5 is a flow diagram that illustrates an embodiment of an electromagnetic breakaway method that changes a state of the electromagnets based on contact between an object and a switch membrane.

In view of the above description, it should be appreciated that one embodiment of an electromagnetic breakaway method that changes a state of the electromagnets based on contact between an object and a switch membrane, the method denoted in FIG. 5 as method 88, comprises causing a deployment of a boom assembly comprising a first portion and a second portion hingeably coupled to the first portion (90); providing a first electromagnetic force between the first and second portions, the first and second portions arranged in-line relative to each other (92); changing a state of a first switch membrane coupled to the second portion based on contact by the first switch membrane with an object (94); and responsive to the change in state of the first switch membrane, changing the first electromagnetic force (96). Note that in one embodiment, the method 88 may be performed by the controller 26 in cooperation with the electromagnets 68 and the first switch membrane 54, and in some embodiments, the method 88 may be performed by additional and/or other electrical and/or electronic circuitry comprising switches and a power source (e.g., current source) in cooperation with (coupled to) the switch membrane 54 and the electromagnets 68.

Figure 6:
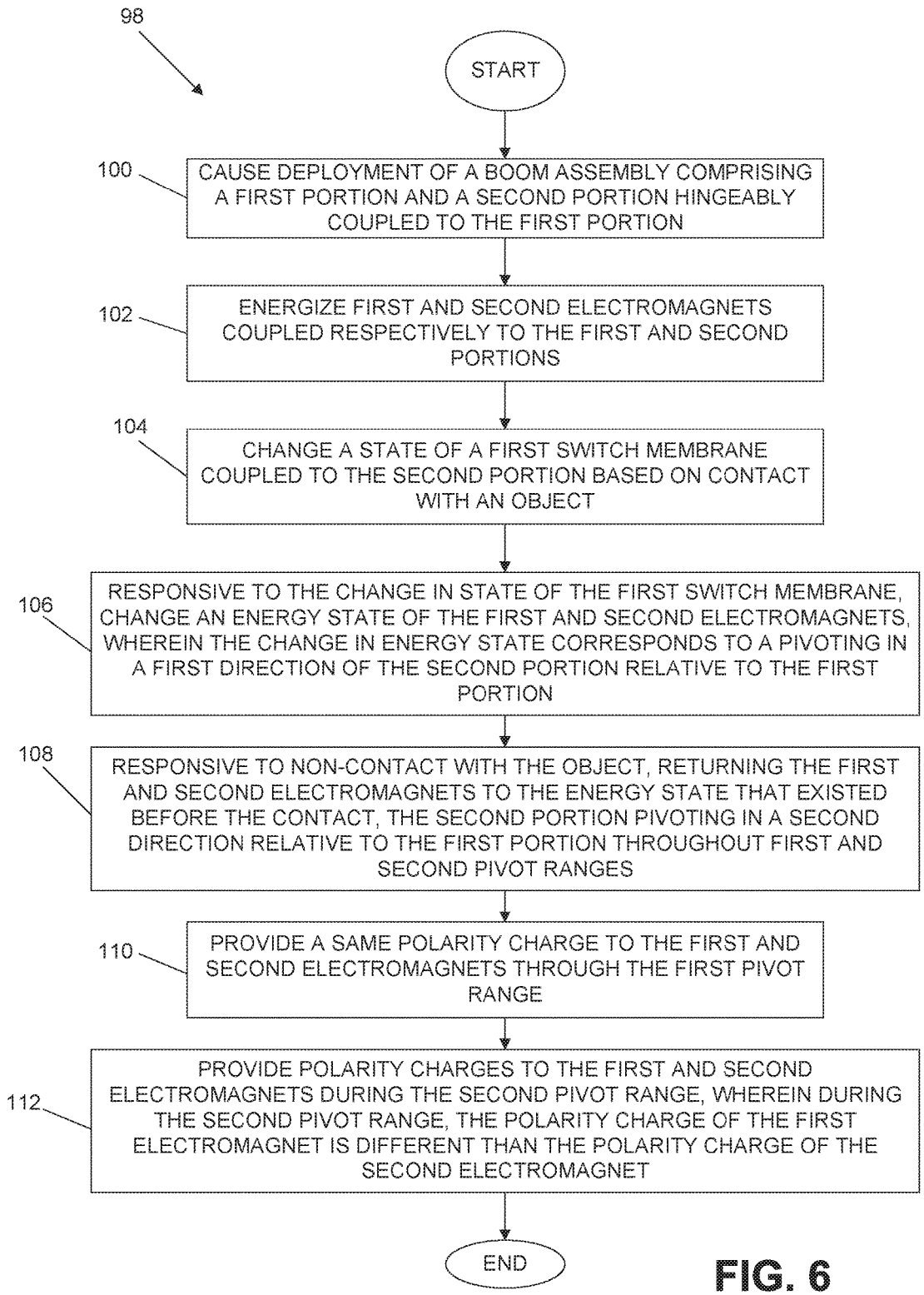
FIG. 6 is a flow diagram that illustrates an embodiment of an electromagnetic breakaway method that changes a polarity of the electromagnets to reduce a speed of the pivotal return of the outer portion of the boom assembly.

Referring to FIG. 6, shown is an embodiment of an electromagnetic breakaway method that changes a polarity of the electromagnets to reduce a speed of the pivotal return of the outer portion of the boom assembly, the method denoted as method 98. The method comprises causing deployment of a boom assembly comprising a first portion and a second portion hingeably coupled to the first portion (100); energizing first and second electromagnets coupled respectively to the first and second portions (102); changing a state of a first switch membrane coupled to the second portion based on contact with an object (104); responsive to the change in state of the first switch membrane, changing an energy state of the first and second electromagnets, wherein the change in energy state corresponds to a pivoting in a first direction of the second portion relative to the first portion (106); responsive to non-contact with the object, returning the first and second electromagnets to the energy state that existed before the contact, the second portion pivoting in a second direction relative to the first portion throughout first and second pivot ranges (108); providing a same polarity charge to the first and second electromagnets through the first pivot range (110); and providing polarity charges to the first and second electromagnets during the second pivot range, wherein during the second pivot range, the polarity charge of the first electromagnet is different than the polarity charge of the second electromagnet (112). Note that in one embodiment, the method 98 may be performed by the controller 26 in cooperation with the electromagnets 68 and the first switch membrane 54, and in some embodiments, the method 98 may be performed by additional and/or other electrical and/or electronic circuitry comprising switches and a power source (e.g., current source) in cooperation with (coupled to) the switch membrane 54 and the electromagnets 68.

Any process descriptions or blocks in flow diagrams should be understood as representing modules, segments, or portions of code which include one or more executable instructions for implementing specific logical functions or steps in the process, and alternate implementations are included within the scope of the embodiments in which functions may be executed out of order from that shown or discussed, including substantially concurrently or in reverse order, depending on the functionality involved, as would be understood by those reasonably skilled in the art of the present disclosure.

It should be emphasized that the above-described embodiments of the present invention are merely possible examples of implementations, merely set forth for a clear understanding of the principles of the disclosure. Many variations and modifications may be made to the above-described embodiment(s) of the disclosure without departing substantially from the spirit and principles of the disclosure. For instance, the different embodiments corresponding to different arrangements and/or locations of electromagnets disclosed herein, the different embodiments of a single or plural switch membranes as disclosed herein, the different sensors, and the different embodiments for the control system are all interchangeable. Also, though described using a boom assembly that relies on gravity for return to the aligned arrangement between inner and outer portions, it should be appreciated that in some embodiments, a boom assembly may be used that does not rely on gravity, which may requiring energization of the electromagnets to pull the outer portion into alignment with the inner portion. All such modifications and variations are intended to be included herein within the scope of this disclosure and protected by the following claims.

At least the following is claimed:

1. A boom assembly electromagnetic breakaway system, the system comprising:
   a boom assembly frame comprising a first portion and a second portion hingably coupled to the first portion; and
   a hinge assembly hingably coupling the first and second portions, the hinge assembly comprising:
      first and second electromagnets coupled respectively to the first and second portions, the first and second electromagnets comprising a same charge polarity when the first and second portions form an angle within a first pivot range, the first and second electromagnets comprising a different charge polarity when the first and second portions form an angle within a second pivot range.

2. The system of claim 1, wherein the first pivot range is greater than the second pivot range.

3. The system of claim 1, wherein the second pivot range is approximately zero.

4. The system of claim 1, wherein the first and second pivot ranges are non-overlapping.

5. The system of claim 1, wherein the second portion pivots at a decreasing speed from a beginning of the first pivot range to an end of the second pivot range.

6. The system of claim 1, further comprising a first switch membrane coupled to the second portion and configured to control an energy state of the first and second electromagnets.

7. The system of claim 6, wherein the first switch membrane is configured to control the energy state based on a change in state of the first switch membrane, wherein in a first state of the first switch membrane, the first and second electromagnets are energized and in a second state of the first switch membrane, the first and second electromagnets are de-energized or reduced to a lower energy state.

8. The system of claim 7, wherein the polarity is controlled during the first state of the first switch membrane.

9. The system of claim 7, wherein the first switch membrane is deformed during the second state or a signal within the first switch membrane is interrupted during the second state.

10. The system of claim 6, further comprising third and fourth electromagnets coupled to the first and second portions, respectively, and a second switch membrane coupled to the second portion, wherein the second switch membrane is configured to control an energy state of the third and fourth electromagnets based on a change in state of the second switch membrane.

11. The system of claim 10, wherein the second switch membrane is coupled to one side of the boom assembly that is opposite the other side of the boom assembly to which the first switch membrane is coupled.

12. The system of claim 10, wherein the second switch membrane is configured to control the energy state of the third and fourth electromagnets based on a change in state of the second switch membrane, wherein in a first state of the second switch membrane, the third and fourth electromagnets are energized and in a second state of the second switch membrane, the third and fourth electromagnets are de-energized or reduced to a lower energy state.

13. The system of claim 12, wherein the polarity of the third and fourth electromagnets is controlled during the first state of the second switch membrane.

14. The system of claim 12, wherein the second switch membrane is deformed during the second state or a signal within the second switch membrane is interrupted during the second state.

15. The system of claim 1, wherein at an end of the second pivot range, the first and second portions are electromagnetically forced into collinear alignment.

16. The system of claim 1, further comprising a controller configured to control the charge polarity of the first and second electromagnets.

17. A method, comprising:
causing deployment of a boom assembly comprising a first portion and a second portion hingably coupled to the first portion;
energizing first and second electromagnets coupled respectively to the first and second portions;
changing a state of a first switch membrane coupled to the second portion based on contact with an object;
responsive to the change in state of the first switch membrane, changing an energy state of the first and second electromagnets, wherein the change in energy state corresponds to a pivoting in a first direction of the second portion relative to the first portion;
responsive to non-contact with the object, returning the first and second electromagnets to the energy state that existed before the contact, the second portion pivoting in a second direction relative to the first portion throughout first and second pivot ranges;
providing a same polarity charge to the first and second electromagnets through the first pivot range; and
providing polarity charges to the first and second electromagnets during the second pivot range, wherein during the second pivot range, the polarity charge of the first electromagnet is different than the polarity charge of the second electromagnet.

18. The method of claim 17, further comprising:
energizing third and fourth electromagnets coupled respectively to the first and second portions, the third and fourth electromagnets for enabling a pivoting of the second portion to a first side of the boom assembly and the first and second electromagnets for enabling a pivoting of the second portion to a second side opposite the first side;
changing a state of a second switch membrane coupled to the second portion based on contact with an object, the second switch membrane coupled to the first side of the boom assembly; and
responsive to the change in state of the second switch membrane, changing an energy state of the third and fourth electromagnets, wherein the change in energy state corresponds to a pivoting of the second portion relative to the first portion in the second direction.

19. The method of claim 18, wherein responsive to non-contact with the object, returning the third and fourth electromagnets to the energy state that existed before the contact, the second portion pivoting in the first direction relative to the first portion throughout first and second pivot ranges;
providing a same polarity charge to the third and fourth electromagnets through the first pivot range; and
providing polarity charges to the third and fourth electromagnets during the second pivot range, wherein during the second pivot range, the polarity charge of the third electromagnet is different than the polarity charge of the fourth electromagnet.

20. A non-transitory computer readable medium comprises executable code, the executable code, when executed by a processor, causes the processor to:
receive a signal from a switch membrane coupled to a boom assembly comprising first and second portions, the switch membrane coupled to the second portion and the second portion hingably coupled to the first portion; and
responsive to reception of the signal:
provide a same polarity charge to first and second electromagnets coupled respectively to the first and second portions, the same polarity charge provided through a first pivot range; and
provide polarity charges to the first and second electromagnets during a second pivot range, wherein during the second pivot range, the polarity charge of the first electromagnet is different than the polarity charge of the second electromagnet.

* * * * *